Feb. 28, 1933.   R. ONO   1,899,474
METHOD OF CONSTRUCTING SUBWAY TUNNELS
Filed Sept. 14, 1931   8 Sheets-Sheet 1

INVENTOR.
Ryoe Ono
BY Dorsey & Cole
ATTORNEYS.

Feb. 28, 1933.  R. ONO  1,899,474
METHOD OF CONSTRUCTING SUBWAY TUNNELS
Filed Sept. 14, 1931  8 Sheets-Sheet 4

INVENTOR.
Ryoe Ono
BY Dorsey & Cole
ATTORNEYS.

Feb. 28, 1933.  R. ONO  1,899,474

METHOD OF CONSTRUCTING SUBWAY TUNNELS

Filed Sept. 14, 1931  8 Sheets-Sheet 7

INVENTOR.
Ryoe Ono
BY Dorsey & Cole
ATTORNEYS.

Patented Feb. 28, 1933

1,899,474

UNITED STATES PATENT OFFICE

RYOE ONO, OF ODORI, SAPPORO, HOKKAIDO, JAPAN

METHOD OF CONSTRUCTING SUBWAY TUNNELS

Application filed September 14, 1931, Serial No. 562,798, and in Japan November 29, 1930.

This invention relates to a method of constructing subway tunnels which permits the digging of tunnels without the use of open trenches or temporary frames, and has for its object the provision of a method whereby such tunnels may be constructed without any disturbance of surface pavements or the like.

A second object is the provision of a method whereby a tunnel as described may be dug in perfect safety, collapse of the dirt sides and ceiling being prevented by means to be hereinafter specified.

A further object is the provision of a method whereby a tunnel as described may be driven through the earth in any direction desired; a curved path being quite as practicable as a straight one.

A still further object is the provision of a method by which a tunnel for the use of subway railroads and the like may be constructed quickly and more economically than may be accomplished by known methods.

It is the general practice, in digging tunnels for the installation of subway railroads and the like, because they are usually dug comparatively near to the surface, to form a trench by cutting down from the ground surface and to then build in the trench a temporary framework which may be used to hold back the earth while a permanent tube of masonry is installed. As a final step, the tube is covered over by the dislodged earth, and the original ground pavement or surface restored. This method results in serious or permanent damage to such surface and, when the trench crosses highways, communication is completely cut off during construction proceedings. The process is additionally expensive because of the cost of removing and replacing so large a quantity of soil; and from the likelihood of cave-ins; and is further objectionable in that the large masses of removed soil must be piled in whatever place is available; usually on the adjacent premises of property owners.

This invention is intended to provide a method for avoiding these objectionable features. In following out my process, the ground surface is disturbed only enough to provide a station at one end of the proposed tunnel, from which the dislodged earth may be removed and through which necessary materials for construction may be brought in. From this beginning the tunnel is excavated exactly to the desired size, at a depth and in a direction planned to attain the objective without disturbance of any pipe lines or the like which have previously been installed beneath the surface. Since the operation does not affect the surface, except at the original opening, the tunnel may cross highways or be extended beneath other structures without interruption or any disturbance of surface activities. The earth removed is exactly equal in volume to the volume of the finished tunnel structure and is removed at a single point, so that no unsightly and damaging heaps of loose soil are caused. Due to the above stated advantages, it has been found that such a tunnel as described may be constructed at a cost approximating a half or even a third of the expense attached to the usual methods.

Referring to the drawings which form a part of this application.

Figure 1:
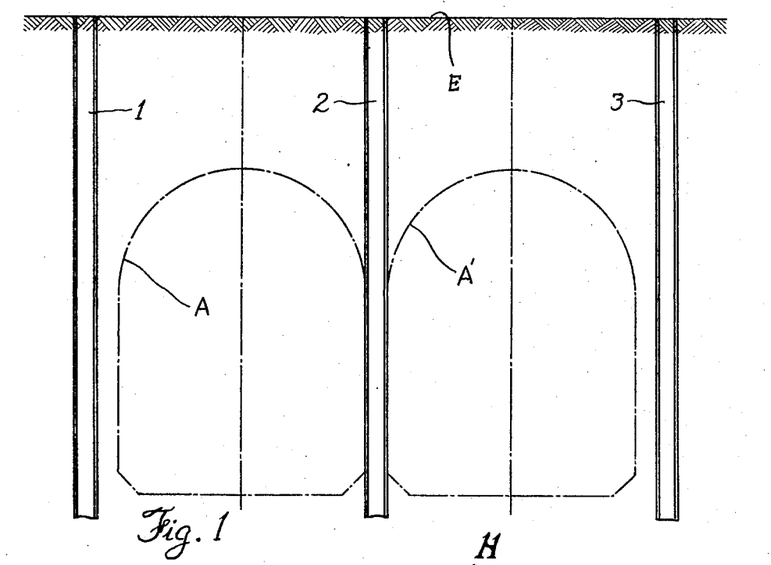
Fig. 1 is a vertical sectional view taken before actual digging has been started.
Figure 2:
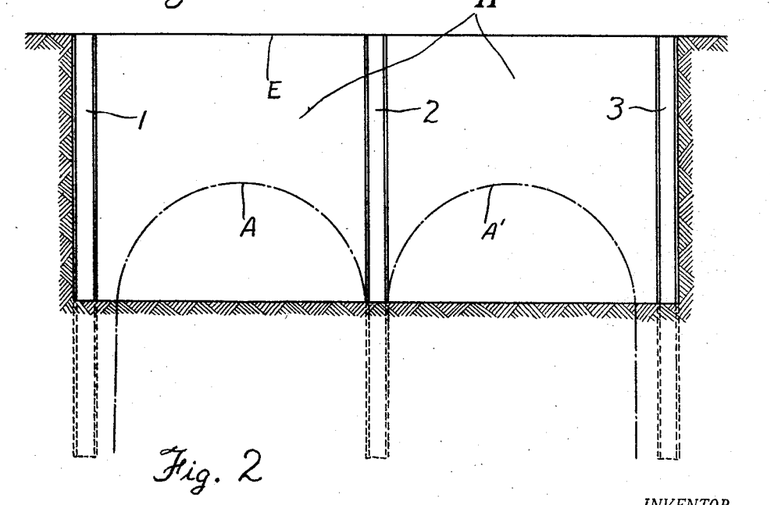
Fig. 2 is a similar view showing the initial station or starting point for the excavation.
Figure 3:
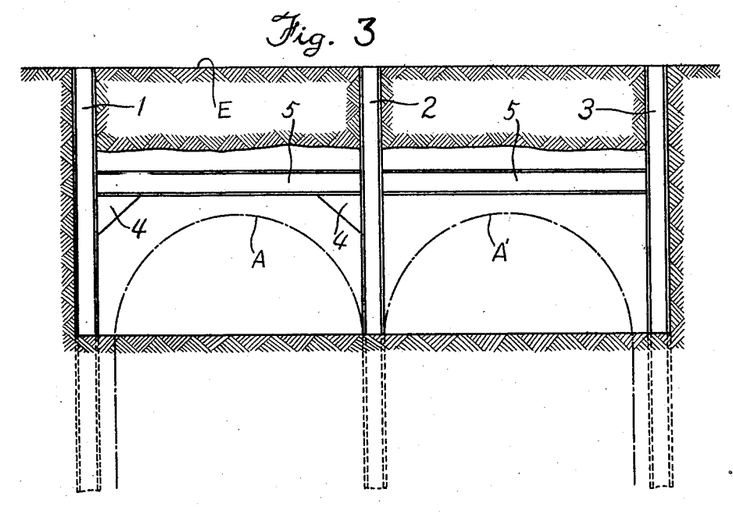
Figs. 3, 4 and 5 are similar views showing modification of the cross beams used as hereinafter described.
Figure 4:
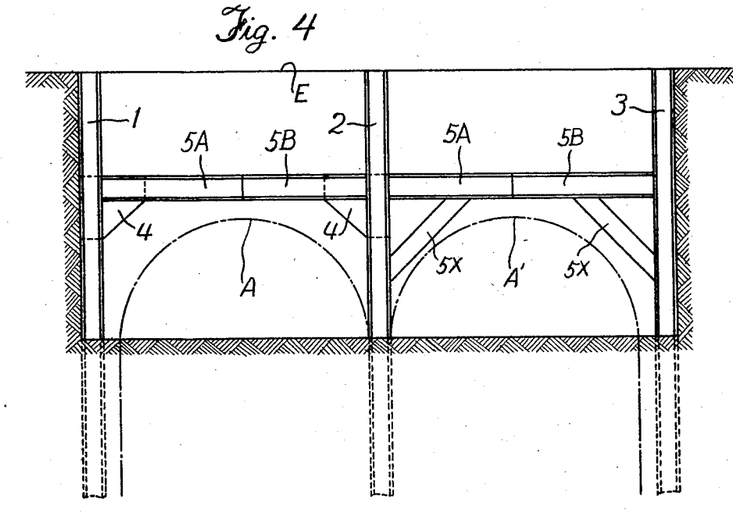

Referring more particularly to the drawings, and especially to Fig. 1 thereof, the letter E represents the ground surface and the portions indicated generally at A and A' in broken lines are the outlines of the tunnels it is proposed to excavate. The first step of the process comprises the driving in opposed sets of the iron or steel piles shown in Fig. 1 at 1, 2 and 3. These piles may have any suitable cross-sectional shape, such as I-beam, T-beam, channel, or whatever best suits the conditions encountered, and they are driven at positions corresponding to the side walls of the tunnel and with due allowance for later concrete or brick reinforcements. If the tunnel is a new one, commencing from a flat surface, the next step is the digging of a pit or station shown at H in Fig. 2; but of course if the tunnel is merely an extension of a previously built tunnel, such a pit is unnecessary. Pit H is dug as shown to the width of the finished subway, and as deep as the top of the tunnel, approximately. Assuming the pit to have been completed and the first pair or set of piles to have been uncovered, the piles are rigidly connected by means of cross beams 5 which may be secured to the piles by riveting, welding, bolting or other suitable means. If desired, a gusset plate 4 may be used to reinforce the joint between cross beam and pile, its use serving to facilitate an adjustable connection where unusual conditions of soil or some unforseen obstruction makes necessary an unequal spacing between the piles. Cross beams 5 may, if found more practical, be made in two or more joined sections, as shown at 5A and 5B in Fig. 4; the sections being joined by welding or some equivalent means. Also in Fig. 5, at 5X, is shown an alternative for gusset plate 4. This takes the form of a cross reinforcement or supporting bracket.

Figure 5:
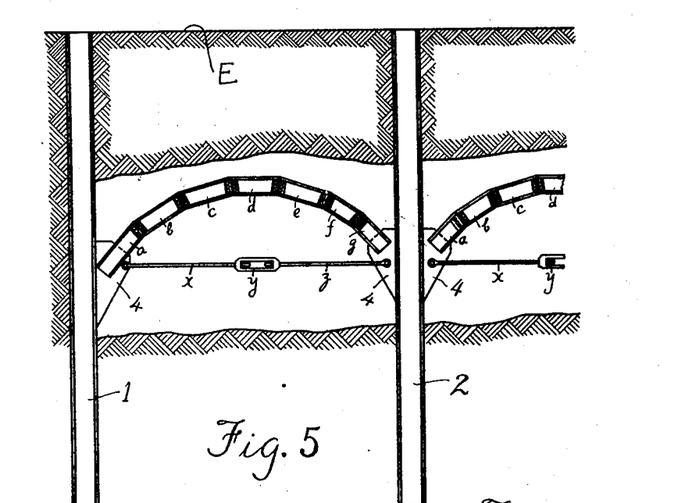
Figure 6:
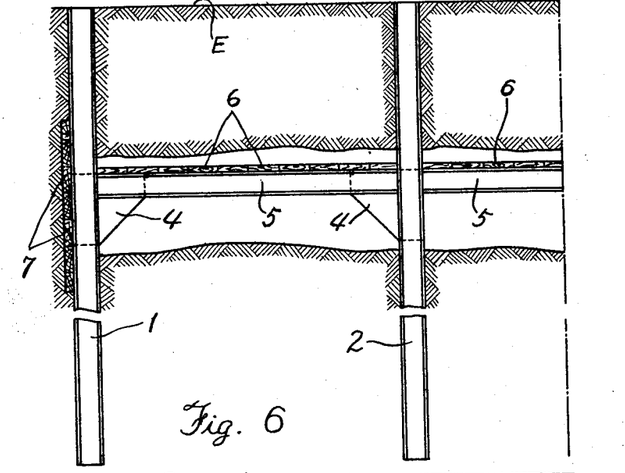
Fig. 6 is a vertical sectional view of the tunnel at a later stage of its construction.
Figure 7:
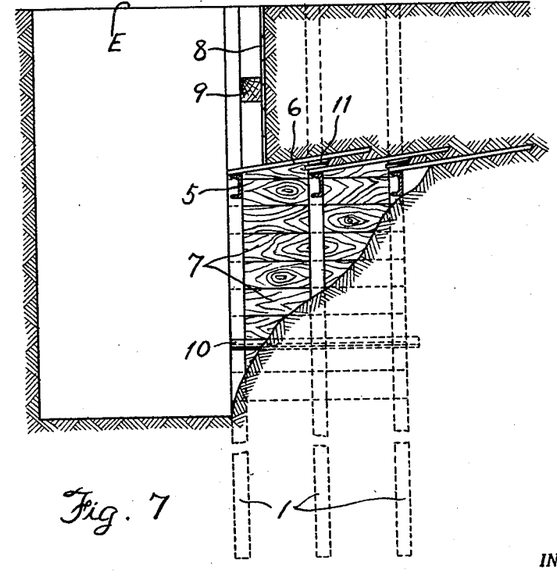
Figs. 7 and 8 are longitudinal sectional views showing the construction of the frame as the digging progresses.

Fig. 5 illustrates another form of cross bracing which has been found best where the underground space is narrow. In this form a number of relatively short pieces $a$, $b$, $c$, $d$, $e$, $f$ and $g$ are joined in the form of an arch, which increases the supporting strength of the frame. Bolts X and Z are joined by a turn buckle Y and comprises a tension member connecting the bases of the completed arch. Such a construction as this provides a further advantage in that the segments may be of such size that they may be handled and assembled by one man.

Each of the forms discussed is designed and intended to be a part of the permanent structure, thus eliminating the expense and time necessary to erect and demolish temporary frame works as in the usual processes of constructing tunnels.

Figure 8:
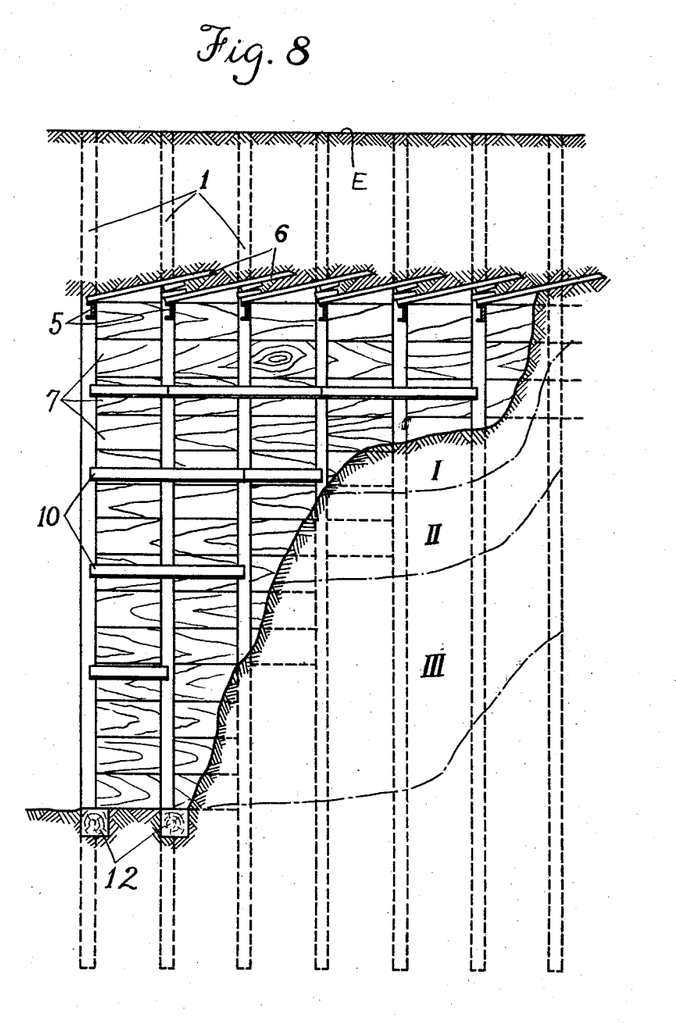
Figure 14:
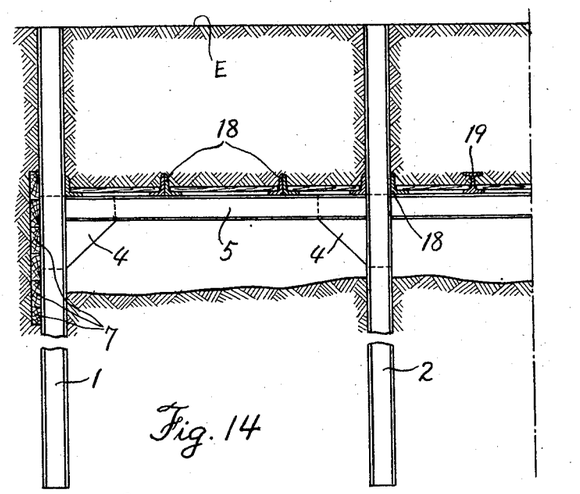
Figs. 14, 15 and 16 are views similar to those shown in Figs. 6, 7 and 9, respectively, but illustrating the use of different lagging supports.
Figure 15:
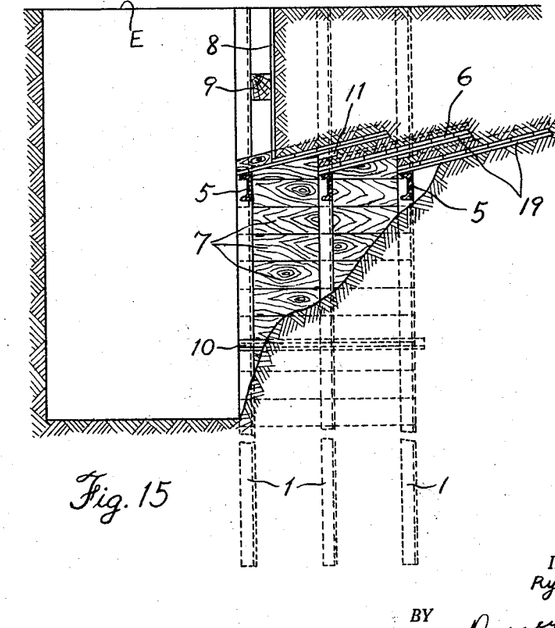

When the cross beam 5, in any of its forms, has been fastened in place, lagging 6 is laid over the beam. The lagging may take the form of a plate, as shown in Figs. 6, 7, 8 and 9, or may be formed of structural iron members such as shown in Figs. 14 and 15. In any case the lagging elements are made sufficiently longer than the space between the adjacent piles so as to support the overlying soil while the next piles are being exposed. This length, of course, may be varied to suit the soil conditions found in any individual case. As shown best in Fig. 7, the next step comprises the addition of lagging 7 to hold back the side dirt walls, and a similar reinforcement 8 with support 9, to prevent loose earth falling into pit H. When these protective measures have been applied, the digging is carried on to the next pair or set of piles, which are connected as described by another cross beam 5, and suitable braces 10 are installed lengthwise of the tunnel. Within the framework thus provided, the excavation proceeds, the framework being added to as space makes it possible, and the sets of piling are successively uncovered and added to the structure. Fig. 8 shows the process at a later stage and indicates, by broken lines I, II and III, the general manner in which the soil is removed in progressive layers.

Figure 9:
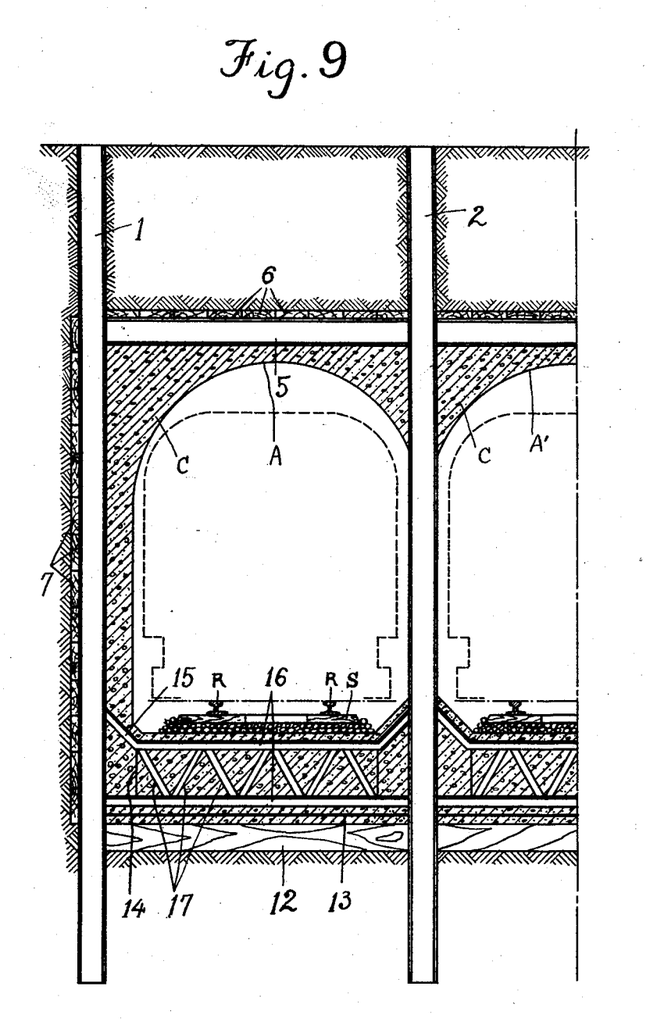
Fig. 9 is a sectional view showing a portion of the completed tunnel with railroad installations.

When the tunnel has been completed, a foundation board 12 is laid and on it a permanent floor of concrete or masonry is built. Within such permanent floor may be a suitable waterproof layer 13. On the concrete floor is built a reinforcement composed of members 15, 16 and 17 which are connected to the piles by means of gusset plates 14, if desired. This step completes the framework of the tunnel, which is then preferably enclosed by concrete C or covered by brickwork. In Fig. 9 the tunnel is shown completed as a subway, the broken lines indicating a railroad construction limit gauge; R representing a rail; and S a sleeper.

Figure 10:
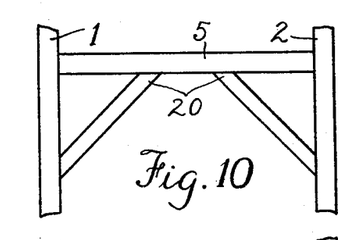
Figs. 10, 11, 12, and 13 are diagrammatic views illustrative of various modifications of reinforcing cross beams.
Figure 11:
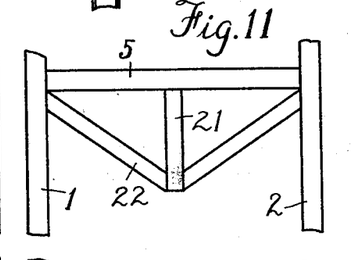
Figure 12:
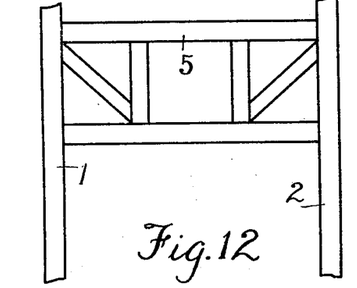
Figure 13:
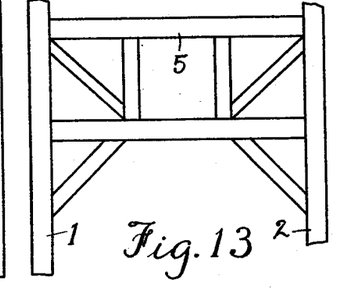

Figs. 10 to 13 illustrate various modifications of cross beam structure provided with reinforcing brackets designed to increase the lightness and strength of the frame. In Fig. 10 this takes the form of simple brackets 20; Fig. 11 shows tension members 22 used in conjunction with a strut 21; and Figs. 12 and 13 show further variations adapted to the same purpose. When structures such as are shown in these figures are used, it may be found that the cross beams and brackets interfere with the driving of lagging 6, in which case the brackets may be temporarily secured in place as by bolts instead of rivets or welding, and so removed to allow for driving the lagging 6.

Figure 16:
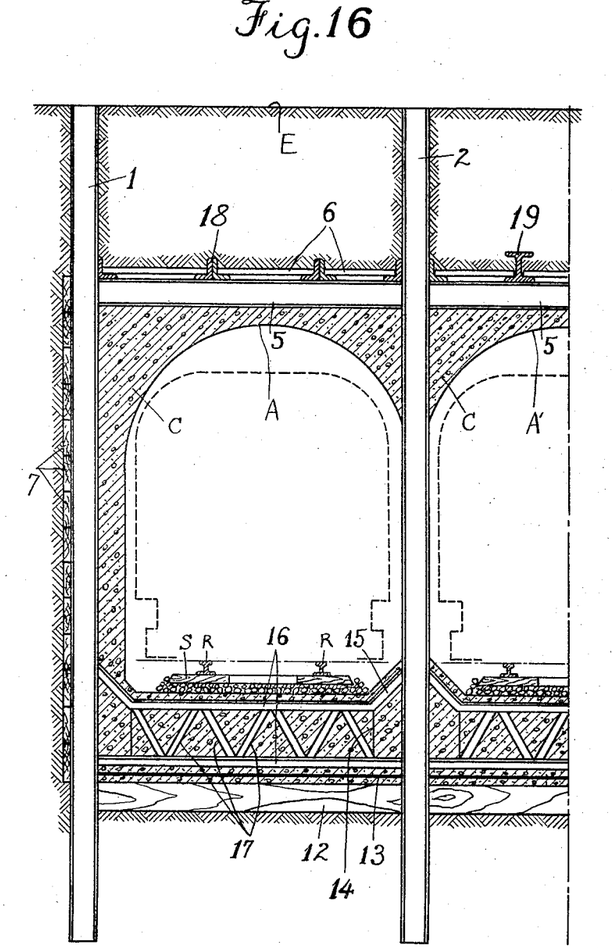

It is not considered necessary to describe in detail Figs. 14 to 16, since these illustrate structures already disclosed, in conjunction with a modified form of top lagging, wherein instead of a plate member 6 there is substituted structural metal beams known commercially as L-beams, or I-beams, or ordinary steel pipe or the like. These give a more rigid and stronger roofing for the excavation.

The L-beams 18 or I-beams 19 are driven forward at proper distances apart. As shown in Fig. 15 these beams are driven upwardly and form an inclined support. The lagging boards or plates 6 are inserted between the beams, their ends resting on the flanges of the beams. This process has the advantages of giving a stronger beam support and shorter and hence stronger lagging pieces 6; and may be carried on with greater safety, since smaller sections of earth may be removed at a time. Also, the greater rigidity of the beams lessens the likelihood of their bending while being driven, as sometimes occurs when a relatively thin plate is driven.

It will be seen from the foregoing description that I have provided a method for constructing subway tunnels and the like which possesses important advantages over current methods. Landslides during construction are either eliminated entirely, or reduced to negligible proportions. The process may be applied to tunnels dug either in a straight line or in any desired curve; it involves no disturbance of the ground level and its structures; and the expense is greatly lowered due to elimination of temporary frames, and from other causes already discussed in the specification.

It is to be understood that the drawings and description relate only to a representative apparatus for the carrying out of my process and it is not intended that the appended claims shall be specifically limited thereto further than the state of the art makes such limitation necessary.

What I claim as new and desire to secure by Letters Patent of the United States is:

1. The method of constructing a tunnel which comprises driving substantially vertically into the ground a plurality of pairs of metal piles in the line of the proposed tunnel walls, each of said pairs of piles being in the same plane transversely of the tunnel, excavating a starting pit across the width of the tunnel and between said metal piles and to a depth substantially to the top of the proposed tunnel, rigidly and permanently securing by means of a metal cross beam the pair of metal piles which have been exposed in the excavating of said pit, said cross beam being located at substantially the level of the top of the proposed tunnel, driving in a forward and upward direction from the level of said cross beam a plurality of metal girders of I or T cross-section and of such length as to pass the next pair of driven metal piles, excavating beneath said metal girders, inserting supporting lagging as the excavating proceeds, said lagging being held and supported by the flanges of said metal girders, introducing side lagging between the driven metal piles as the excavating proceeds, rigidly and permanently securing by means of a second cross beam the second pair of driven metal piles, driving a second set of supporting metal girders in a forward and upward direction as before, and enclosing all of said piles, beams and girders in a finishing layer of concrete, the said lagging elements being used as a mold for the concrete.

2. A method as described in claim 1 in which more than two piles are driven in a plane transverse to the longitudinal line of the proposed tunnel.

3. A method as described in claim 1 in which the structural elements recited are enclosed in a protective wall of masonry.

In testimony whereof I have affixed my signature.

RYOE ONO.